United States Patent
Sekihara

(10) Patent No.: US 8,123,998 B2
(45) Date of Patent: Feb. 28, 2012

(54) INJECTION MOLDING METHOD AND INJECTION MOLDING DIE

(75) Inventor: Kanji Sekihara, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/933,914

(22) PCT Filed: Mar. 19, 2009

(86) PCT No.: PCT/JP2009/055434
§ 371 (c)(1),
(2), (4) Date: Sep. 22, 2010

(87) PCT Pub. No.: WO2009/119441

PCT Pub. Date: Oct. 1, 2009

(65) Prior Publication Data

US 2011/0018171 A1   Jan. 27, 2011

(30) Foreign Application Priority Data

Mar. 28, 2008  (JP) ................................. 2008-085895

(51) Int. Cl.
B29C 45/40 (2006.01)

(52) U.S. Cl. ........... 264/328.1; 249/63; 249/64; 249/67; 264/334; 425/556; 425/577

(58) Field of Classification Search .................. 425/577, 425/556; 264/328.1, 334; 249/63, 64, 66.1, 249/67, 74

See application file for complete search history.

(56) References Cited

U.S. PATENT DOCUMENTS

| 2,834,989 A | | 5/1958 | Kusnery | |
|---|---|---|---|---|
| 5,644,833 A | * | 7/1997 | Starkey | 29/527.2 |
| 5,780,079 A | * | 7/1998 | Lee | 425/577 |
| 2002/0018825 A1 | | 2/2002 | Starkey | |

FOREIGN PATENT DOCUMENTS

| JP | 3-108518 | | 5/1991 |
|---|---|---|---|
| JP | 2000-108161 | | 4/2000 |
| JP | 2002-164602 | * | 6/2002 |
| JP | 2003-004700 A | | 1/2003 |
| JP | 2003-215140 | | 7/2003 |
| JP | 2003-326558 | | 11/2003 |
| JP | 2005-40985 | * | 2/2005 |
| JP | 2007-229589 | | 9/2007 |

OTHER PUBLICATIONS

Electronic translation of Japanese reference 2005-40985.*

* cited by examiner

*Primary Examiner* — Jill Heitbrink
(74) *Attorney, Agent, or Firm* — Cozen O'Connor

(57) ABSTRACT

An injection molding method for a plate-shaped resin substrate, wherein a through-hole whose diameter gradually becomes smaller from one surface to the other surface is provided thereon and fine flow path that connects to the through-hole is provided on the other surface. A cavity is formed by joining one molding die forming one surface with the other molding die forming the other surface. A part of the one molding die that forms the through-hole includes a taper pin that protrudes from the one molding die toward the other molding die. The substrate is formed by filling the cavity with resin material, and the substrate is released from the other molding die by separating the one molding die from the other molding die. By pushing the inner wall of the through-hole with the taper pin projected further toward the other molding die, the substrate is released from the one molding die.

16 Claims, 11 Drawing Sheets

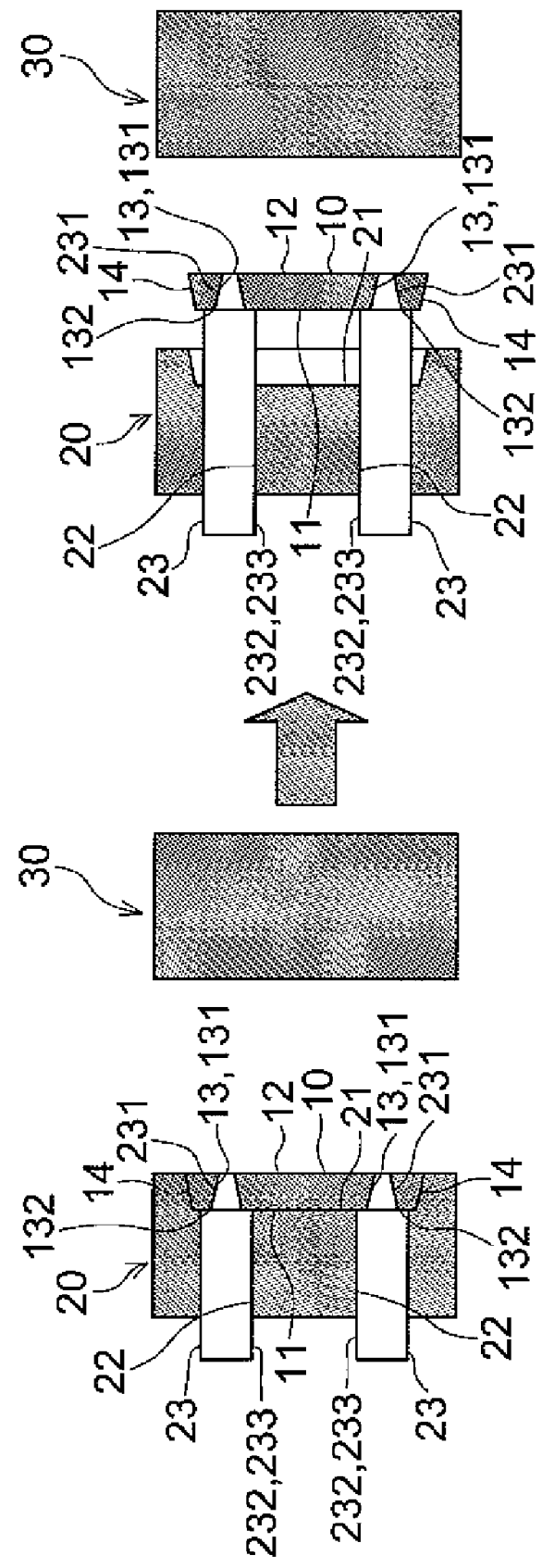

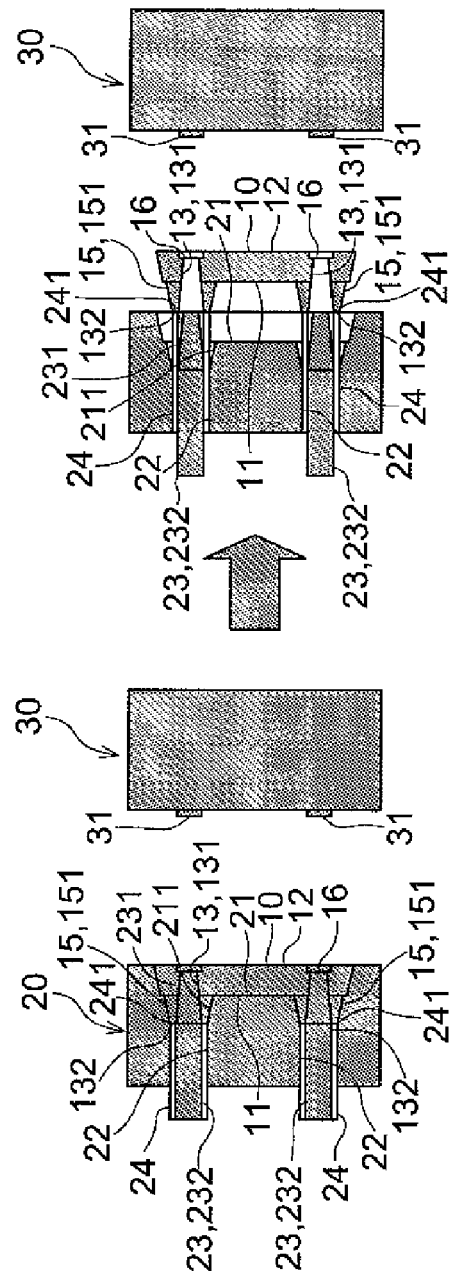
FIG. 4a
FIG. 4b
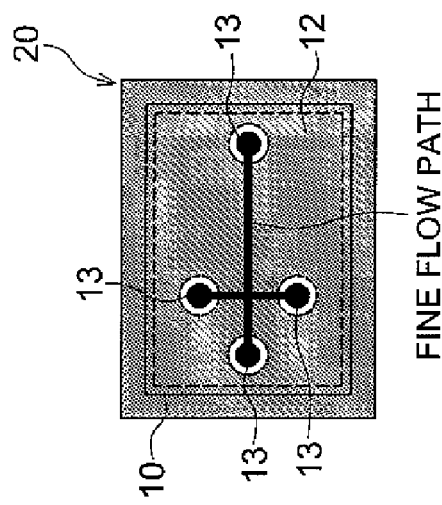
FIG. 4c

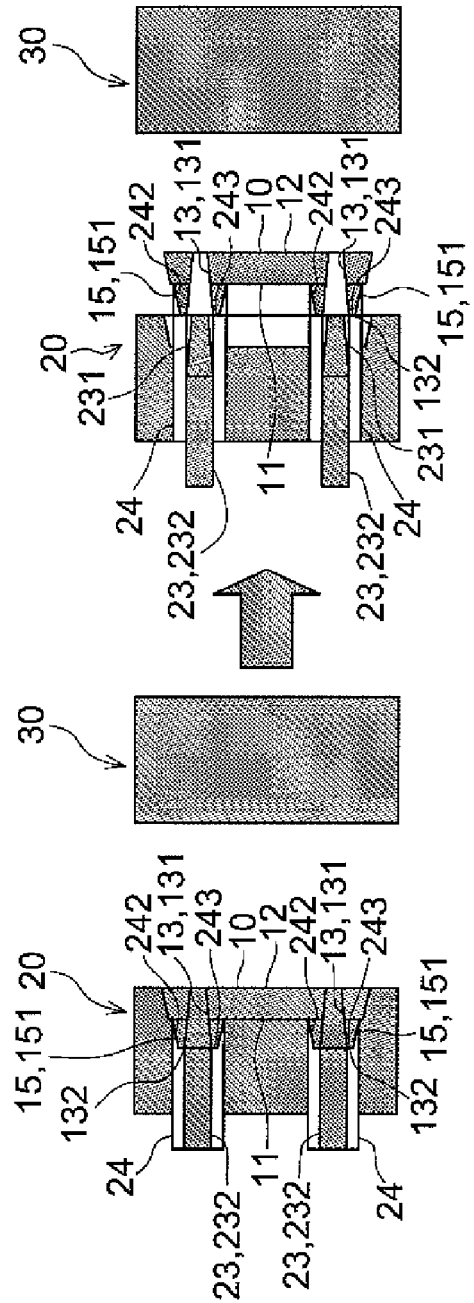

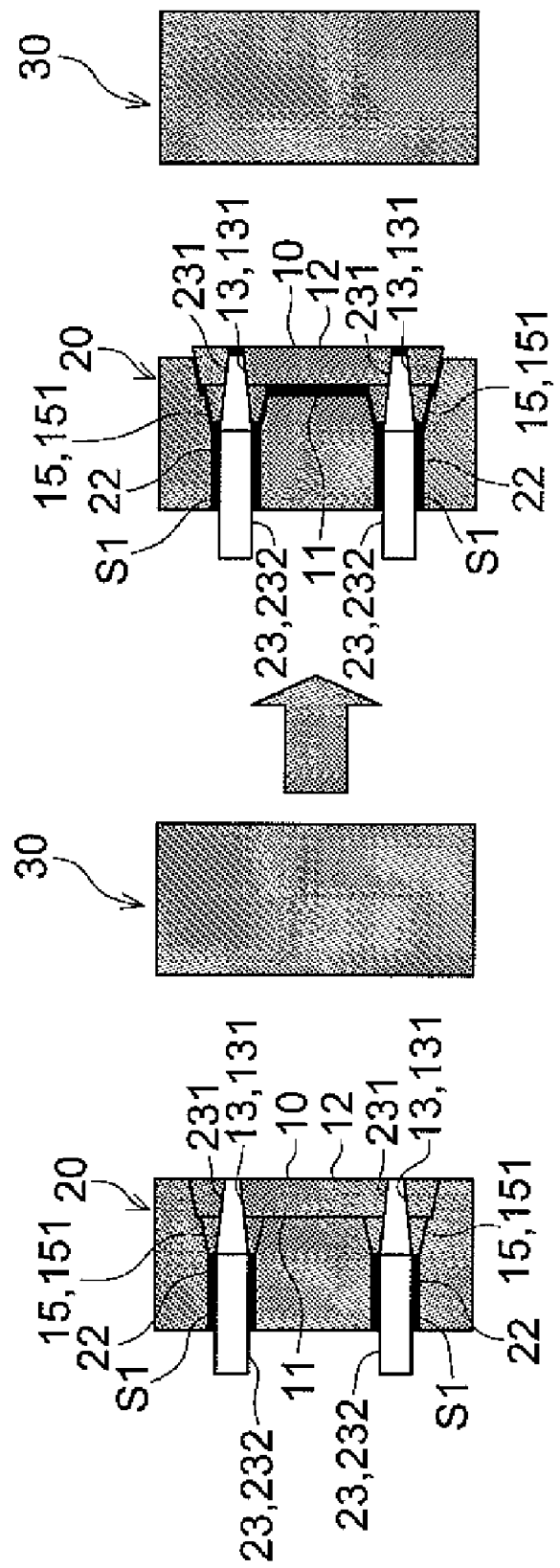

FIG. 9
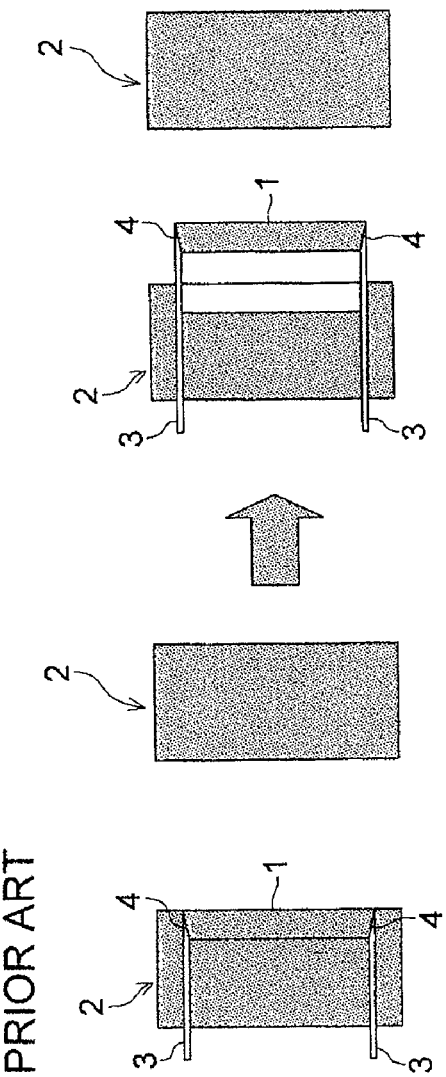
PRIOR ART
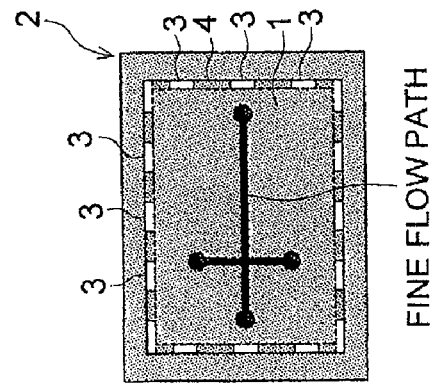
FINE FLOW PATH

FIG. 10 PRIOR ART
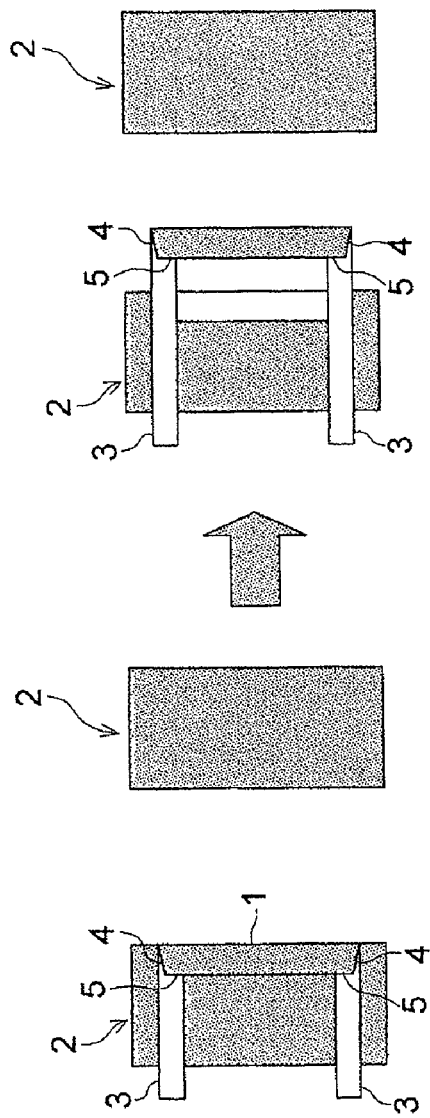
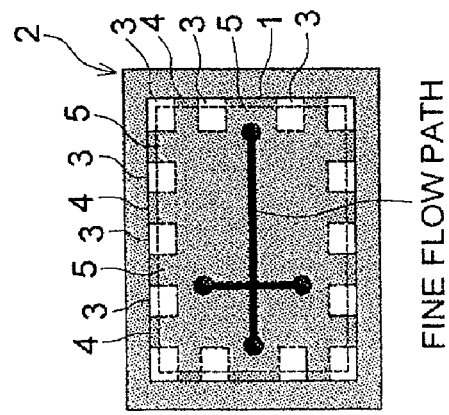
FINE FLOW PATH

INJECTION MOLDING METHOD AND INJECTION MOLDING DIE

RELATED APPLICATIONS

This application is a U.S. National Phase Application under 35 USC 371 of International Application PCT/JP2009/055434 filed Mar. 19, 2009.

This application claims the priority of Japanese application 2008-085895 filed Mar. 28, 2008, the entire content of which is hereby incorporated by reference.

FIELD OF THE INVENTION

This invention relates to an injection-molding method and an injection-molding die. It is especially related with the injection-molding method and injection-molding die for a plate-shaped substrate made of resin, wherein a fine flow path has been formed at least on one or both sides of the substrate and a covering material is joined to the surface of the side.

BACKGROUND OF THE INVENTION

By using a fine processing technology and by forming a fine flow path or a circuit on a silicone or glass substrate, equipment called the micro-analysis chip μTAS (Micro Total Analysis Systems) which conducts, in a minute space, a chemical reaction, separation, analysis of liquid samples, such as nucleic acid, protein, and blood, have been put in practical use. As an advantage of such a microchip, the amount of a sample or reagent used or the amount of discharge of waste fluid is reduced, and realization of a cheap, portable and space-saving system can be considered. A microchip is manufactured by binding two components, on at least one of which the micro-fabrication is performed.

In conventional arts, a glass substrate is used for a microchip and the various micro-fabrication methods are proposed. For example, there is the photoresist method as a method of forming a fine flow path on the surface of a glass substrate (for example, patent document 1). However, a glass substrate is not fit for a mass production method, and since its cost is very high, development of the microchip made of resin, which is cheap and disposable, is desired.

Further, there is a method of forming a fine flow path on a substrate of PDMS (polydimethylsiloxane) by the optical lithography method (for example, patent document 2). There is an advantage that edges remain (the edge or corner of a fine flow path does not become dull) in the fine flow path formed by the optical lithography method. However, by the optical lithography method, the microchip cost is high.

There is a method of forming a fine flow path in a plate-shaped substrate by the injection-molding method, which reduces the cost of a microchip, which is a major goal. This injection-molding method requires high transferability of the fine flow path for leaving edges of fine flow paths by making molding pressure high and ejection speed fast, for example. If trying to attain high transferability, the mold release resistance will become large and the release of a mold will become difficult. If the release of mold is carried out by force, distortion will remain in the joint surface on which the fine flow path has been formed. Moreover, when the mold release resistance becomes large, the form of a fine flow path changes at the time of the mold release. Furthermore, the flatness of the joint surface of the substrate is reduced by the undulation or curvature which is generated at the time of the mold release. The flatness demanded for the joint surface is 10 μm or less, for example.

Especially in injection molding of the substrate made of resin having one or more through-holes (wells) for introducing a sample or a reagent into a fine flow path, the wall of a through-hole adheres to a die by contraction of resin after molding. Thereby, mold release resistance of a through-hole becomes large. Therefore, near the through-hole, change of the form of the fine flow path is marked, and there is a tendency for the flatness of the substrate to be also reduced markedly.

In a substrate where a cylindrical part (chimney) is provided to protrude to the opposite side from the joint surface of the substrate, on the opposite surface to the joint surface and where a through-hole is prepared in the center of the cylindrical part, the area where the wall of the through-hole adhering to the die increases and mold release resistance of the through-hole becomes still larger, by contraction of resin after molding. Therefore, the tendency changing the form of a fine flow path and reduction of the flatness of the substrate becomes extremely marked near the through-hole.

Generally for a joint of resin materials, adhesives, such as glue, are used. In the joint using an adhesive, the adhesive layer has a certain amount of thickness, and does double duty as a shock absorbing material. Therefore, it is not often the case that distortion and flatness of an adhesion side influence the joint's properties.

However, the substance which may have influence on the analysis cannot be allowed to be placed between the joint surfaces of a substrate in the microchip made by joining a covering material. Therefore, direct joint of the substrate and a covering material based on a joint using heat is required.

Experiments showed that the distortion and reduction of flatness of a joint surface influences joint accuracy and quality greatly in a jointing process using heat.

When a covering material is joined to the joint surface of a substrate using heat, the distortion and reduction of flatness of a joint surface reduces the joint's strength of the substrate and the covering material. Then, the sealing property of a fine flow path or a through-hole is reduced, and air contamination (air retention) on the joint surface occurs. It generates and has large influence on the joint accuracy and quality of the microchip.

In conventional injection-molding methods, as a technology for separating the mold, which is a substrate, from a die, there is a method of separation from a die 2 by pushing an empty area of a substrate 1 by the ejector pins 3, as shown in FIG. 8. Further, as shown in FIG. 9, there is a method of separation from a die 2 by pushing out the taper-shaped peripheral wall 4 of the substrate 1 by the ejector pins 3. Furthermore, as shown in FIG. 10, there is a method of pushing out the taper-shaped peripheral wall 4 and the peripheral edges 5 of the substrate 1 by the ejector pins 3, each having a step. Furthermore, as shown in FIG. 11, there is a method of pushing out the entire surface 6 of the substrate 1 by a block 7.

[Patent document 1] Unexamined Japanese Patent Application Publication No. 2003-215140

[Patent document 2] Unexamined Japanese Patent Application Publication No. 2006-53064

DISCLOSURE OF THE INVENTION

Problems to be Solved by the Invention

However, by the methods shown in the above-mentioned FIG. 8 to FIG. 10, since mold release resistance of a through-hole is large, there was a problem, near the through-hole, that the distortion and reduction of flatness of a joint surface occur. Furthermore, in the method shown in FIG. 11, there was a problem of being restricted to a mold where the whole surface of the substrate is empty.

This invention solves the above-mentioned problems. In other words, the invention aims at offering the injection-molding method and injection-molding die, where distortion of the joint surface of the substrate produced by injection molding is mitigated and which can prevent the reduction of the flatness of the joint surface.

Means for Solving the Problems

According to this invention, the above-mentioned problems are solved by pushing the inner wall of a through-hole with a part of the die for forming the through-hole, by paying attention to the distortion and reduction of flatness of a joint surface occurring near the through-hole, having large mold release resistance.

To be more specific, the 1st embodiment of this invention is an injection molding method of a plate-shaped substrate made of resin, on which a through-hole is provided so that the size of the hole gradually becomes smaller in the direction from one surface of the substrate toward the other surface which is located on the opposite side of the substrate from the one surface and on which a fine flow path, which communicates with the through-hole, is provided on the other surface, with a covering material joined to the other surface, and with the injection molding method including the steps of: coupling a die of one side, which forms one surface with a die of the other side, which forms the other surface so as to compose a cavity; the first composing a part of the die of one side which forms the through-hole by using a taper pin protruded from the die of one side toward the die of other side; filling the cavity with the resin material so as to form the substrate; separating the substrate and the die of the other side from each other by separating the die of one side and the die of the other side from each other; and extruding the substrate to separate the substrate from the die of one side by pushing an inner wall of the through-hole, using the taper pin which protrudes further toward the die of the other side.

Further, the 2nd embodiment of this invention is an injection molding method of a plate-shaped substrate made of resin, on which a cylindrical part is provided on one surface of the substrate to protrude toward the opposite side from the other surface which is located on the opposite side of the substrate from one surface, and a through-hole is provided in a center of the cylindrical part so that the size of the hole becomes gradually smaller in the direction from the one surface toward the other surface, and on which a fine flow path, which communicates with the through-hole, is formed on the other surface, with a covering material joined onto the other surface, and with the injection molding method including the steps of coupling a die of one side, which forms one surface with a die of the other side, which forms the other surface so as to compose a cavity; the first composing a part of the die of one side which forms the through-hole by using a taper pin protruded from the die of one side toward the die of the other side; the second composing a part of the die of one side which forms an entrance periphery of the through-hole on the cylindrical part by using an end surface of a sleeve which has been moved into a base hole on the die of one side, the sleeve being fitted around the taper pin and capable of being moved into and moved out of the base hole; filling the cavity with resin material so as to form the substrate; separating the substrate and the die of the other side from each other by separating the die of one side and the die of the other side from each other; and extruding the substrate to separate the substrate from the die of one side by pushing the entrance periphery of the through-hole on the cylindrical part by using the end surface of the sleeve protruded from the base hole.

Furthermore, the 3rd embodiment of this invention is the injection-molding method given in either the 1st embodiment or the 2nd embodiment, and characterized in that, in the coupling step, the die of one side is moved closer to the die of the other side, which is a die of the stationary side, and in the separating step, the die of one side is moved away from the die of the other side.

Furthermore, the 4th embodiment of this invention is the injection-molding method given in any of the 1st embodiment to the 3rd embodiment, and characterized in that, in the coupling step, the position where a tip of the taper pin comes in contact with the die of the other side is a position which has been shifted from a part of the die of the other side which forms the other surface, toward the die of one side by an amount substantially equivalent to the depth of the fine flow path.

Furthermore, the 5th embodiment of this invention is the injection-molding method given in the 1st embodiment, and characterized in that, in the first composing step, a large diameter part which is integrally formed on the taper pin, for forming the entrance periphery of the through-hole composes the part of the die of one side, and in the extruding step, the entrance periphery of the through-hole is pushed by the large diameter part.

Furthermore, the 6th embodiment of this invention is the injection-molding method given in any of the 1st embodiment to the 5th embodiment, and characterized by further having: previously extracting the taper pin so as to separate the wall of the through-hole and the taper pin from each other by retracting the taper pin in the opposite direction from the die of the other side, before the extruding step.

Furthermore, the 7th embodiment of this invention is the injection-molding method given in the 2nd embodiment, and characterized in that, in the second composing step, the outer wall formation part which forms an outer wall of the cylindrical part whose diameter gradually becomes larger in the direction from the tip side of the cylindrical part toward the surface which is the base end side composes a part of the die of one side, with the outer wall formation part integrally formed on the end surface of the sleeve, and further in the extruding step, the outer wall of the cylindrical part is pushed by the outer wall formation part.

Furthermore, the 8th embodiment of this invention is an injection molding die for a plate-shaped substrate made of resin, on which a cylindrical part is provided on one surface of the substrate to protrude from the surface toward the opposite side from the other surface which is located on the opposite side of the substrate from the one surface, and a through-hole is provided in the center of the cylindrical part so that the size of the hole gradually becomes smaller in the direction from the one surface toward the other surface, and on which a fine flow path, which communicates with the through-hole, is formed on the other surface, with a covering material joined the other surface, and with the injection molding die including: a die of one side, which forms the one surface; a die of the other side, which forms the other surface and from which the substrate is separated by separating the die of the other side from the die of one side relatively, after coupling the die of the other side with the die of one side, to compose a cavity and filling the cavity with resin material to form the substrate; a taper pin which composes a part of the die of one side which forms the through-hole by protruding from the die of one side toward the die of the other side; and a sleeve which is fitted around the taper pin and capable of being moved into and moved out of a base hole of the die of one side and whose end surface composes a part of the die of one side which forms an entrance periphery of the through-hole on the cylindrical part by having been moved into the base hole.

Effects of the Invention

According to the 1st embodiment of this invention, the inner wall of a through-hole adheres to a taper pin by contraction of resin after molding. Since the inner wall of the through-hole is pushed out with the taper pin, the mold release resistance of the through-hole is small, and distortion of the joint surface near the through-hole can be eased. Moreover, the reduction of the flatness of the joint surface can be prevented.

Further, according to the 2nd embodiment and 8th embodiment of this invention, the inner wall of the through-hole adheres to the taper pin by contraction of resin after molding. Since the entrance periphery of the through-hole of the cylindrical part is pushed out with a sleeve, it can ease distortion of the joint surface, near the through-hole. Moreover, the reduction of the flatness of the joint surface can be prevented.

Since the die on the other side, which is a die for forming a fine flow path, is made to be a die on the stationary side according to the 3rd embodiment of this invention, when injection molding, the die of the other side can maintain high accuracy of position, and formation with high accuracy for the fine flow path becomes possible.

When a burr occurs after molding owing to a gap produced near the position in which the tip of a taper pin and the die of the other side make contact, according to the 4th embodiment of this invention, the burr having been generated is mostly made at nearly the same position of the fine flow path in depth. Therefore, the flatness of the joint surface is not affected.

Furthermore, since the entrance periphery of the through-hole is pushed out by the large diameter part of the taper pin, according to the 5th embodiment of this invention, the mold release resistance of the through-hole becomes still smaller. Therefore, near the through-hole, distortion and reduction of flatness of the joint surface can be further prevented, the release of the mold can be stably carried out.

Yet further, according to the 6th embodiment of this invention, the inner wall of the through-hole adheres to the taper pin after molding. Since the inner wall of the through-hole can be separated from the taper pin by retracting the taper pin, mold release resistance of the through-hole becomes very small. Therefore, in an extrusion process, the mold can be picked out from one die, without generating distortion and reduction of flatness of the joint surface near the through-hole.

Furthermore, according to the 7th embodiment of this invention, the inner wall of the through-hole adheres to the taper pin by contraction of resin after molding. Since the outer wall of a cylindrical part is pushed out by the outer wall formation part, distortion of the joint surface can be eased near the through-hole. Further, the reduction of the flatness of the joint surface can be prevented, and the release of the mold can be stably carried out.

BRIEF DESCRIPTION OF THE DRAWINGS

FIGS. 2a and 2b are sectional views of the injection-molding die concerning a modification of the 1st embodiment.

FIGS. 4a, 4b and 4c are sectional views of the injection-molding die concerning the 2nd embodiment.

FIGS. 5a, 5b and 5c are sectional views of the injection-molding die concerning a modification of the 2nd embodiment.

FIGS. 7a and 7b are sectional views of the injection-molding die concerning the 4th embodiment.

FIG. 9 shows sectional views of a conventional injection-molding die.

FIG. 10 shows sectional views of a conventional injection-molding die.

DESCRIPTION OF THE SYMBOLS

Figure 1A:
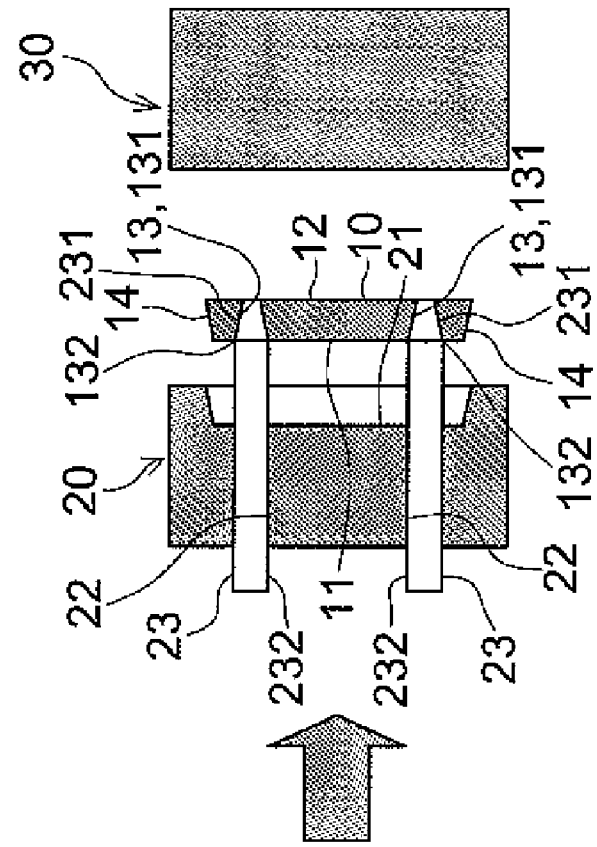
FIGS. 1a and 1b are sectional views of the injection-molding die concerning the 1st embodiment.

S1 Gap
10 Substrate
11 Surface of one side
12 Surface of the other side
13 Through-hole
131 Inner wall of through-hole
132 Entrance periphery of through-hole
14 Peripheral wall
15 Cylindrical part
151 Outer wall of cylindrical part
16 Groove portion
20 Die of one side
21 Depressed portion
211 Taper channel
22 Base hole
23 Taper pin
231 Taper part
232 Cylinder part
233 Large diameter part
24 Sleeve
241 End surface of sleeve
242 Outer wall formation part
243 Peripheral formation part
30 Die of the other side
31 Platform part

BEST MODE FOR PERFORMING THE INVENTION

The 1st Embodiment

The injection-molding die concerning the 1st embodiment of this invention is described with reference to FIGS. 1a and 1b, which are sectional views of an injection-molding die.

A plate-shaped substrate 10 molded by the injection-molding die concerning the 1st embodiment will be described first. A through-hole 13 is provided on the substrate 10 so that the hole diameter of the through-hole 13 may become smaller gradually in the direction from a surface 11 of one side to the surface 12 of the other side. A fine flow path (not illustrated) which communicates with the through hole 13 is prepared on the surface 12 of the other side. A covering material (not illustrated) is joined on the surface 12 of the other side on which a fine flow path is provided. A microchip is constituted by the substrate 10 and the covering material joined on the surface 12 of the other side of the substrate 10. The surface 11 of one side of the substrate 10 is a plane on which a fine flow path is not provided. Moreover, the surface 12 of the other side on which a fine flow path is provided is a joint surface where the covering material is joined.

A substrate 10 is made, of annular polyolefin resin of a transparent resin material, with an injection molding machine into the plate-shaped member whose outside dimension is 50 mm×50 mm×1.5 mm, with two or more fine flow paths of 50 μm in width and 50 μm in depth.

The material of the covering material is annular polyolefin resin of a transparent resin material, and the outside dimension of the covering material is 50 mm×50 mm×(30 μm-300 μm).

In the substrate 10, distortion may remain in the plane which is the surface 11 of one side, however distortion on the joint surface which is the surface 12 of the other side is not desired. Moreover, the inner wall 131 of the through-hole 13 adheres to a part of die (taper part 231 to be mentioned later) due to contraction of resin after molding, and the mold release resistance is large. Therefore, distortion of the joint surface which is the surface 12 of the other side is easily generated near the through-hole 13.

As mentioned above, the hole diameter becomes smaller gradually, and the inner wall 131 of the through-hole 13 has a gradient angle of 3-5 degrees. Thereby, when introducing a liquid sample into the through-hole 13, air is prevented from remaining in the interior of the through-hole 13. Moreover, the peripheral wall 14 of the substrate 10 is inclined outward at 3-5 degrees from the surface 11 toward the surface 12 of the other side.

Next, an injection-molding die will be described. This injection-molding die has a die 20 of one side which forms surface 11 of one side of the substrate 10 and a die 30 of the other side which forms the surface 12 of the other side. The die 20 of one side is a movable side die, and the die 30 of the other side is a stationary side die.

The depressed portion 21 is formed in die 20. The die 20 is brought close to the die 30 of the other side, and a cavity which is the filling space of resin material is formed by coupling both of the dies. A depressed portion 21 is equivalent to the cavity. The mold which is the substrate 10 is formed by filling the cavity with resin material. The base hole 22 is provided to extend through the depressed portion 21. A taper pin 23 is fitted to be capable of moving in and out the base hole 22.

The taper pin 23 is integrally formed of the taper part 231 of the tip side and the cylinder part 232 of the base side. The state where the cylinder part 232 is pulled into the base hole 22, and the taper part 231 is inside the depressed portion 21 (cavity) and projects toward the die 30 of the other side is illustrated in FIG. 1a. In this state, the taper part 231 constitutes a part of the die 20 for fabricating the through-hole 13.

The surface 11 and peripheral wall 14 of the substrate 10 adhere to the die 20. Further, the joint surface which is the surface 12 of the other side of the substrate 10 adheres to the die 30 of the other side. The contacting area of the die 30 of the other side to the mold which is the substrate 10 is smaller than that of the die 20. By making the die 20 and the die 30 of the other side separate, the mold as the substrate 10 is stuck to the die 20 and the mold is separate from the die 30 of the other side. At this time, the inner wall 131 of the through-hole 13 adheres to the taper part 231 which constitutes a part of the die 20.

Figure 1B:
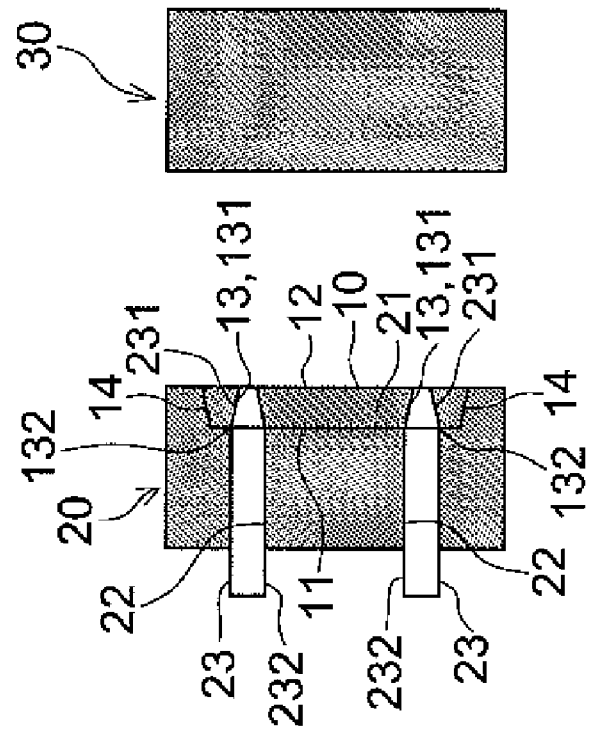

The state where a part of cylinder part 232 projects from the base hole 22, and the taper pin 23 projects further toward the die 30 of the other side from the inside of a depressed portion 21 is shown in FIG. 1b. The mold which is the substrate 10 is separate from the die 20 in this state, while the taper part 231 pushes out the inner wall 131 of the through-hole 13. In the state shown in FIG. 1b, the inner wall 131 of the through-hole 13 is in a state where it adheres to the taper part 231.

In the state where both the cylinder part 232 and the taper part 231 are retracted into the base hole 22, since the circumferential edge of the base hole 22 pushes out the entrance periphery 132 of the through-hole 13, the taper part 231 is extracted from the through-hole 13 relatively. Therefore, the extraction of the mold which is the substrate 10 from the die becomes possible.

Next, description will be made about the injection-molding method of the substrate made of resin using the above injection-molding die, referring to FIGS. 1a and 1b.

(Coupling Process)

The die 20 which is a movable side die is brought close to the die 30 of the other side which is a stationary side die, and both dies 20 and 30 are coupled. A cavity is formed by covering the depressed portion 21 of the die 20 with the die 30 of the other side.

(The 1st Composition Process)

The taper part 231 is in the depressed portion 21, and projects toward the die 30 of the other side. It constitutes a part of the die 20 for forming the through-hole 13. The taper part 231 projecting toward the die 30 of the other side touches a part of the die 30 of the other side which forms the surface 12 (a joint surface of the mold) of the other side of the substrate 10.

In addition, the 1st composition process can be conducted before the coupling process, after the coupling process, or simultaneous with the coupling process (parallel). Moreover, it is also possible that the taper part 231 retracts into the base hole 22 in the starting stage of the 1st composition process, and moves out toward the die 30 of the other side from the base hole 22 to become located inside the depressed portion 21 before termination of the 1st composition process.

(Filling Process)

Next, the mold, which is the substrate 10, is formal by filling up the cavity with resin material. A fine flow path is formed in the surface 12 of the other side of the substrate 10. The through-hole 13 is formed in the substrate 10. Due to the demand of high transferability of the fine flow path, injection molding is carried out with a fast ejection speed and high molding pressure. The surface 11 and peripheral wall 14 of the substrate 10 adhere to the die 20. Further, the inner wall 131 of the through-hole 13 adheres to the taper part 231 which constitutes a part of the die 20. Furthermore, the surface 12 of the other side of the substrate 10 adheres to the die 30 of the other side.

(Separation Process)

Next, the die 20 which is a movable side die is taken away from the die 30 of the other side which is a stationary side die. Since the adhesion area of the die 30 of the other side to the mold is smaller than that of the die 20 of one side, if the die 20 of one side is separated from the die 30 of the other side, the surface 12 (a joint surface of the mold) of the other side of the substrate 10 will be separated from the die 30 of the other side.

(Extrusion Process)

Next, the surface 11 (a plane surface of the mold) of the substrate 10 is separated from the die 20 by pushing out the inner wall 131 of the through-hole 13 with the taper part 231 which is made to move out further toward the die 30 of the other side from the inside of the depressed portion 21.

While the inner wall 131 of the through-hole 13 adheres to the taper part 231, the inner wall 131 of the through-hole 13 is pushed out. Therefore, mold release resistance of the through-hole 13 is relatively small. Thus, the distortion of the surface 12 (a joint surface of the mold) of the other side of the substrate 10 is mitigated, near the through-hole 13. Moreover, reduction of flatness of the joint surface can be prevented. Furthermore, the inner wall 131 of the through-hole 13 is pushed out with the taper part 231. When equally positioned arrangement of the through-holes 13 has been made in the mold, the mold can be ejected while keeping proper balance.

(Retraction Process)

Next, both the cylinder parts 232 and taper parts 231 of a taper pin 23 are retracted into the base hole 22. By this action, the circumferential edge of the base hole 22 pushes out the entrance periphery 132 of the through-hole 13, and the taper part 231 is relatively extracted from the through-hole 13, and then is separated from the inner wall 131 of the through-hole 13. Furthermore, all the adhered portions of the mold which is the substrate 10 with the die are separated. The mold, as the substrate 10, can be taken out, without distortion to the surface 12 (a joint surface of the mold) of the other side of the substrate 10.

Next, the injection-molding die concerning a modification of the 1st embodiment will be described referring to FIGS. 2a and 2b, which are sectional views of the injection-molding die concerning a modification example. In addition, in the subsequent modifications, in order to prevent symbols from becoming complicated, even if there is a difference in shape or the like, the same symbols will be assigned to the parts of the same names.

The feature of the injection-molding die concerning the modification is that the taper pin 23 has a large diameter part 233. The large diameter part 233 is formed by forming the whole cylinder part 232 on the base end side to be large in diameter. The large diameter part 233 has a larger outside diameter than the maximum diameter of the taper part 231 on the tip side. The large diameter part 233 constitutes a part of the die 20 which forms the entrance periphery 132 of the through-hole 13. The state where the large diameter part 233 constitutes a part of the die 20 is shown in FIG. 2a.

In the above-mentioned extrusion process where the taper part 231 is made to move out further toward the die 30 of the other side from the inside of the depressed portion 21 pushes out the inner wall 131 of the through-hole 13, the large diameter part 233 pushes on the entrance periphery 132 of the through-hole 13 toward the die 30 of the other side, to push it out. In FIG. 2b, the state where the large diameter part 233 has pushed out the entrance periphery 132 of the through-hole 13. In addition, the large diameter part 233 may be integrally formed in the intermediate part between the taper part 231 on the tip side and the cylinder part 232 on the base end side.

Since the entrance periphery 132 of the through-hole 13 is pushed out by the large diameter part 233 of the taper pin 23, it becomes possible to stably carry out the release of the mold which is the substrate 10 from the die 20. Moreover, the mold release resistance of the through-hole 13 becomes still smaller, near the through-hole 13 and distortion and reduction of flatness of the surface 12 (a joint surface of the mold) of the other side of the substrate 10 can be further inhibited.

Figure 3B:
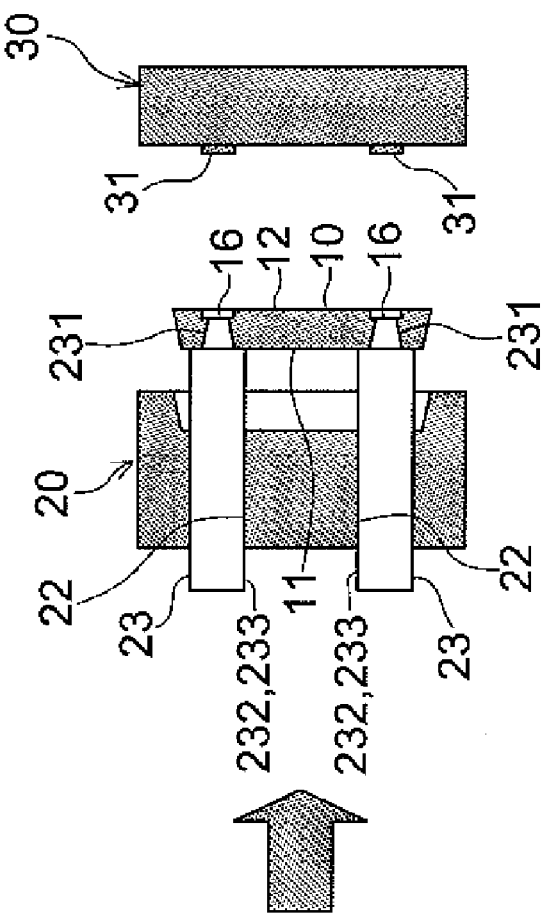
FIGS. 3a and 3b are sectional views of the injection-molding die concerning another modification of the 1st embodiment.
Figure 3A:
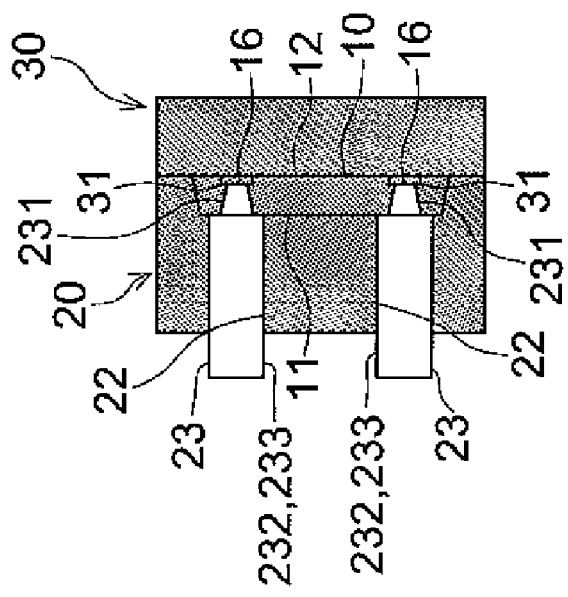

Next, the injection-molding die concerning another modification of the 1st embodiment will be described referring to FIGS. 3a and 3b, which are sectional views of the injection-molding die concerning another modification.

The injection-molding die concerning the modification differs from that of the above-mentioned 1st embodiment on the following composition. In the above-mentioned 1st embodiment, during the coupling process of the die 20 and the die 30 of the other side, the taper part 231 of the taper pin 23 is brought into contact with apart of die 30 of the other side to form the surface 12 (a joint surface of the mold) of the other side of the substrate 10. The position where the taper part 231 of the taper pin 23 is brought into contact with the die 30 of the other side in the modification is located at the position which has been shifted from one of apart of the die 30 of the other side to form the surface 12 (joint surface) of the other side toward the die 20 by a distance substantially equivalent to the depth of the fine flow path (not illustrated).

The taper pin 23 is shorter by the length where the position in which the taper pin 23 and the die 30 of the other side are brought into contact has been shifted. Further, a platform part 31 having a height equivalent to the shift amount is formed on the die 30 of the other side. The area of the top surface of the platform part 31 is larger than the area of the tip surface of the taper pin 23. In FIG. 3a, the state where the taper part 231 has come into contact with the platform part 31 is shown. Moreover, in FIG. 3b, the state where the mold, which is the substrate 10, has been pushed out by the taper part 231 is shown.

When a burr occurs after molding owing to the gap produced near the position in which the taper pin 23 and the platform part 31 of the die 30 of the other side are coupled, the burr mostly occurs at the position corresponding to the depth of the fine flow path. Therefore, the flatness of the surface 12 (a joint surface of the mold) of the other side of the substrate 10 is not affected. As shown in FIGS. 3a and 3b, the groove portion 16 is formed on the surface 12 of the other side of the substrate 10 by means of the platform part 31.

Although the die 20 is used as the movable side die and the die 30 of the other side is used as the stationary side die, in the above-mentioned 1st embodiment, the reverse mode is also feasible.

The 2nd Embodiment

Next, the injection-molding die concerning the 2nd embodiment will be described with reference to FIGS. 4a-4c, which are sectional views of the injection-molding die concerning the 2nd embodiment.

First the substrate 10, formed by the injection-molding die concerning the 2nd embodiment, will be described. The point that makes the substrate 10 concerning the 2nd embodiment different from the substrate 10 concerning the 1st embodiment is having a cylindrical part (chimney) 15.

The cylindrical part 15 is provided on the surface 11 of the substrate 10, to protrude from the surface toward the opposite side from the surface 12 of the other side. The surface 12 of the other side is a joint surface where a fine flow path is formed. In FIG. 4c, the die 30 of the other side is removed and a plan view of the die 20 and the surface 12 (joint surface) of the other side of the substrate 10 is shown.

The cylindrical part 15 has the height of three times or more of the plate thickness of the substrate 10. Generally the height of the cylindrical part 15 is three to five times the plate thickness of the substrate 10. The outer wall 151 of the cylindrical part 15 gradually enlarges in diameter from the tip side toward the surface 11 side, which is the base end side. The outer wall 151 has a gradient angle of 3-5 degrees.

The through-hole 13 is provided in the center of the cylindrical part 15. The through-hole 13 is longer than the through-hole 13 concerning the above-mentioned 1st embodiment by only the height of the cylindrical part 15. The area of the inner wall 131 of the through-hole 13 is also larger, and the taper part 231 which forms the through-hole 13 is also longer. Due to contraction of the resin after molding, the inner wall 131 of the through-hole 13 adheres to the taper part 231 over a larger area, and the mold release resistance of the through-hole 13 increases.

Next, the injection-molding die concerning the 2nd embodiment will be described. The following two points make this injection-molding die greatly different from the injection-molding die concerning the 1st embodiment.

The 1st difference is the point that the taper channel 211 for forming the outer wall 151 of the cylindrical part 15 is formed in the depressed portion 21 of the die 20. The taper channel 211 and the base hole 22 continues toward each other, and the position of the inner end of the taper channel 211 and the position of the entrance of the base hole 22 correspond to each other.

The 2nd difference is the following. In the 1st embodiment, the mold which is the substrate 10 is separated from the die 20 by making the taper part 231 of the taper pin 23 protrude toward the die 30 of the other side. On the other hand, the mold which is the substrate 10 is separated from the die 20 with a newly prepared sleeve 24 in the 2nd embodiment.

The sleeve 24 is prepared in the base hole 22 of the die 20, capable of moving in and out, in the state where the sleeve 24 is fitted to the outside of the taper pin 23. The end surface 241 of the sleeve 24, which is retracted into the base hole 22, constitutes a part of the die 20 and forms the entrance periphery 132 of the through-hole 13 of the cylindrical part 15. In FIG. 4a, the state where the end surface 241 of the sleeve 24 is located in the entrance of the base hole 22 is shown.

Next, the injection-molding method concerning the 2nd embodiment will be described referring to FIGS. 4a-4c. The point making this ejection molding method different from the ejection molding method concerning the 1st embodiment is having a newly established 2nd composition process, and having changed the extrusion process and the retraction process. Hereafter, the 2nd composition process, the extrusion process, and the retraction process will be described. Descriptions of almost the same processes as of the 1st embodiment will be omitted.

(The 2nd Composition Process)

The sleeve 24 is retracted into the base hole 22 and as shown in FIG. 4a and the end surface 241 of the sleeve 24 is positioned at the entrance of the base hole 22 (inside the inner end of the taper channel 211). The end surface 241 of the sleeve 24 constitutes a part of the die 20 which forms the entrance periphery 132 of the through hole 13 of the cylindrical part 15.

In addition, the 2nd composition process may be conducted before the coupling process, may be after the coupling process, or may be simultaneous and parallel to the coupling process. Similarly, the 2nd composition process may be conducted before the 1st composition process, may be conducted after the 1st composition process, or may be conducted simultaneous and parallel to the 1st composition process.

Further, the end surface 241 of the sleeve 24 is positioned at the entrance of the base hole 22 from the start stage of the 2nd composition process. However, the condition is not restricted to this. At the starting stage, the end surface 241 of the sleeve 24 is positioned at the position where the end surface 241 of the sleeve 24 protrudes from the entrance of the base hole 22 or where it has retracted from the entrance of the base hole 22. It is only required to be positioned at the entrance of the base hole 22 before termination of the 2nd composition process.

(Extrusion Process)

The entrance periphery 132 of the through-hole 13 of the cylindrical part 15 is pushed out by the end surface 241 of the sleeve 24 which is made to protrude toward the die 30 of the other side from the base hole 22. This movement separates the mold, which is the substrate 10, from the die 20. In FIG. 4b, the state where the end surface 241 of the sleeve 24 has been made to protrude out of the depressed portion 21 is shown.

In addition, as it may be understood by FIGS. 4a and 4b, the taper pin 23 is being fixed to the die 20, and therefore, it differs from the taper pin 23 concerning the above-mentioned 1st embodiment, which is fitted into the base hole 22, capable of moving in and out.

By pushing out the entrance periphery 132 of the through-hole 13 of the cylindrical part 15 by the end surface 241 of the sleeve 24, the surface 11 (a plane of the mold) of the substrate 10 is separated from the depressed portion 21. Further, the outer wall 151 of the cylindrical part 15 is separated from the taper channel 211, and the inner wall 131 of the through hole 13 is separated from the taper part 231, which is pulled out of the through-hole 13 relatively.

Since the entrance periphery 132 of the through-hole 13 of the cylindrical part 15 adheres to the end surface 241 of the sleeve 24 and other portions do not adhere to the die, the mold release resistance is small. Therefore, distortion is not left on the mold as the substrate 10, and the mold can be taken out easily.

Since the entrance periphery 132 of the through-hole 13 of the cylindrical part 15 is pushed out by the end surface 241 of the sleeve 24, the distortion of the surface 12 (a joint surface) of the other side of the substrate 10 can be mitigated, even near the through-hole 13 where the mold release resistance has been increased. Moreover, reduction of flatness of the surface 12 (joint surface) of the other side can be inhibited.

(Retraction Process)

In the above-mentioned 1st embodiment, the taper pin 23 is retracted into the base hole 22. On the other hand, in this 2nd embodiment, since the taper pin 23 is fixed to the die 20, the sleeve 24 is retracted into the base hole 22.

In the retraction process, the sleeve 24 is retracted into the base hole 22, and the end surface 241 of the sleeve 24 is positioned at the entrance of the base hole 22. In the extrusion process mentioned above, when because of the mold release resistance, the mold cannot be taken out, the sleeve 24 is further retracted into the base hole 22. It only needs to separate the entrance periphery 132 of the through-hole 13 of the cylindrical part 15 from the end surface 241 of the sleeve 24.

Next, the injection-molding die concerning a modification of the 2nd embodiment will be described, referring to FIGS. 5a-5c, which are sectional views of the injection-molding die concerning the modification.

The feature of the injection-molding die concerning the modification is that the tip part of the sleeve 24 has an outer wall formation part 242 to form the outer wall 151 of the cylindrical part 15 and the periphery formation part 243 for forming the entrance periphery 132 of the through-hole 13 of the cylindrical part 15.

The sleeve 24 is retracted into the base hole 22, and the outer wall formation part 242 of the sleeve 24 is made to be positioned at the entrance of the base hole 22 during the filling process in the injection-molding method concerning the modification. The state where the outer wall formation part 242 is located at the entrance of the base hole 22 is shown in FIG. 5a. When the die 30 of the other side is removed, a plan view of the die 20 and the surface 12 (joint surface) of the other side of the substrate 10 is shown in FIG. 5c.

Further, in the extrusion process, the sleeve 24 is made to protrude, toward the die 30 of the other side, from the base hole 22, and by the outer wall formation part 242, the outer wall 151 of the cylindrical part 15 is pushed out toward the die 30 of the other side. At the same time, the entrance periphery 132 of the through-hole 13 of the cylindrical part 15 is pushed by the periphery formation part 243 toward the die 30 of the other side. In FIG. 5b, the state where the outer wall 151 of the cylindrical part 15 and other parts have been pushed out of the depressed portion 21 is shown.

The outer wall 151 of the cylindrical part 15 is pushed by the outer wall formation part 242, and the entrance periphery 132 of the through-hole 13 is pushed out by the periphery formation part 243. Therefore, the distortion of the surface 12 (a joint surface of the mold) of the other side of the substrate 10 near the through-hole 13 can be mitigated and reduction of flatness of the surface 12 (joint surface) of the other side can be inhibited. Furthermore, release of the mold can be stably carried out.

The 3rd Embodiment

Next, the injection-molding die concerning the 3rd embodiment will be described with reference to FIGS. 6a and 6b, which are sectional views of the injection-molding die concerning the 3rd embodiment.

The feature of the injection-molding die concerning the 3rd embodiment is that the sleeve 24 concerning the 2nd embodiment is eliminated. Also in the 3rd embodiment, the through-hole 13 is provided in the center of the cylindrical part 15, and the mold release resistance on the through-hole 13 is large.

The injection-molding method concerning the 3rd embodiment includes a precedent extraction process where the inner wall 131 of the through-hole 13 is separated from the taper pin 23 by retracting the taper pin 23 toward the opposite side from the die 30 of the other side before the extrusion process where the mold which is the substrate 10 is separated from the die 20 with the taper pin 23.

(Precedent Extraction Process)

Figure 6A:
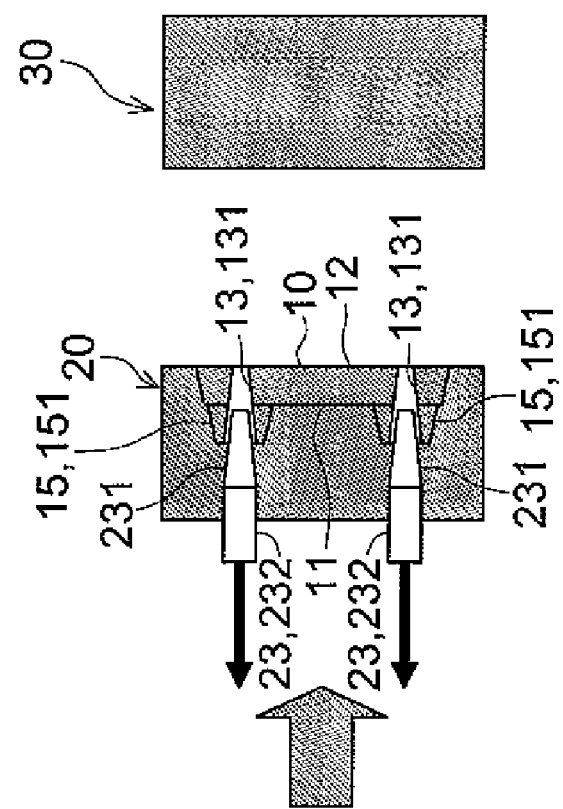
FIGS. 6a and 6b are sectional views of the injection-molding die concerning the 3rd embodiment.
Figure 6B:
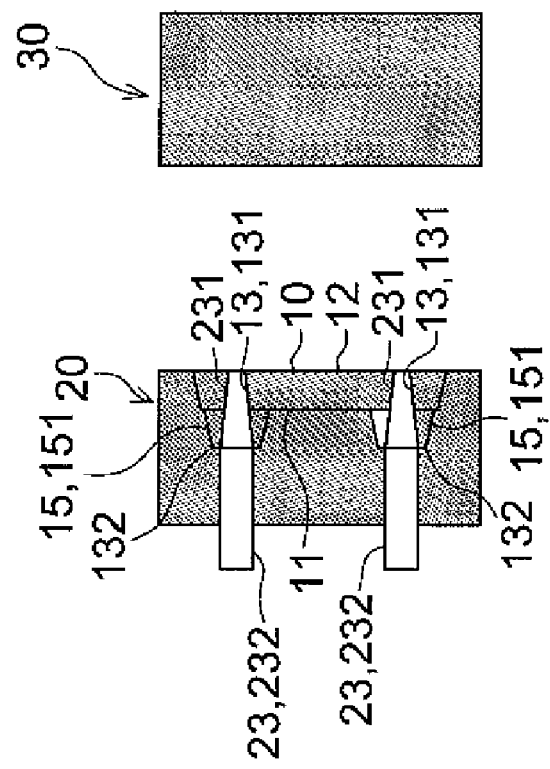
Figure 8:
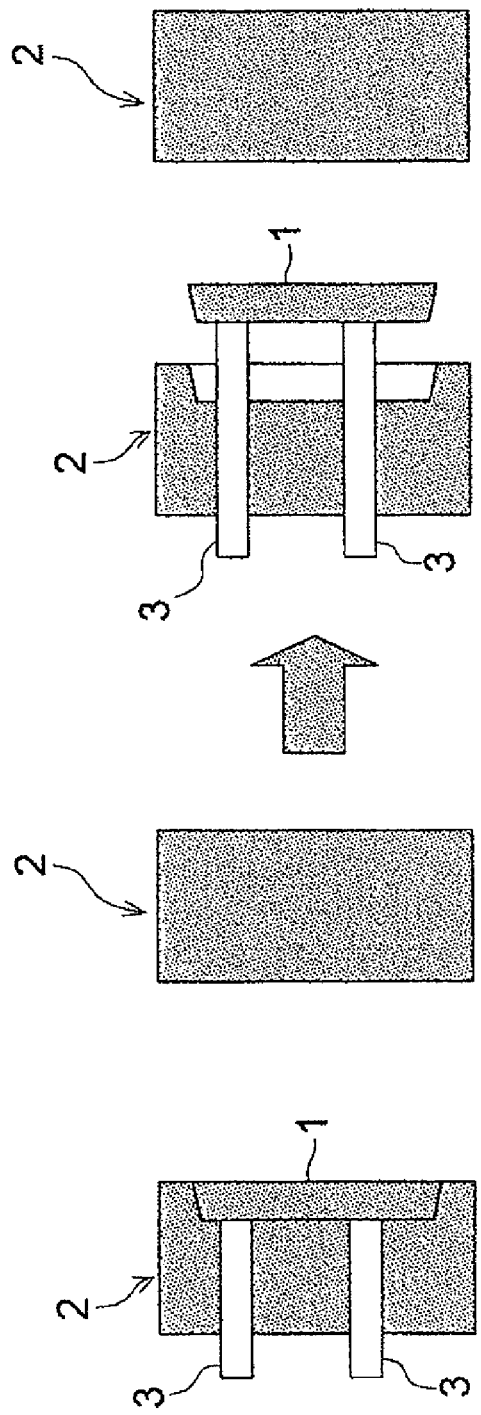
FIG. 8 shows sectional views of a conventional injection-molding die.
Figure 11:
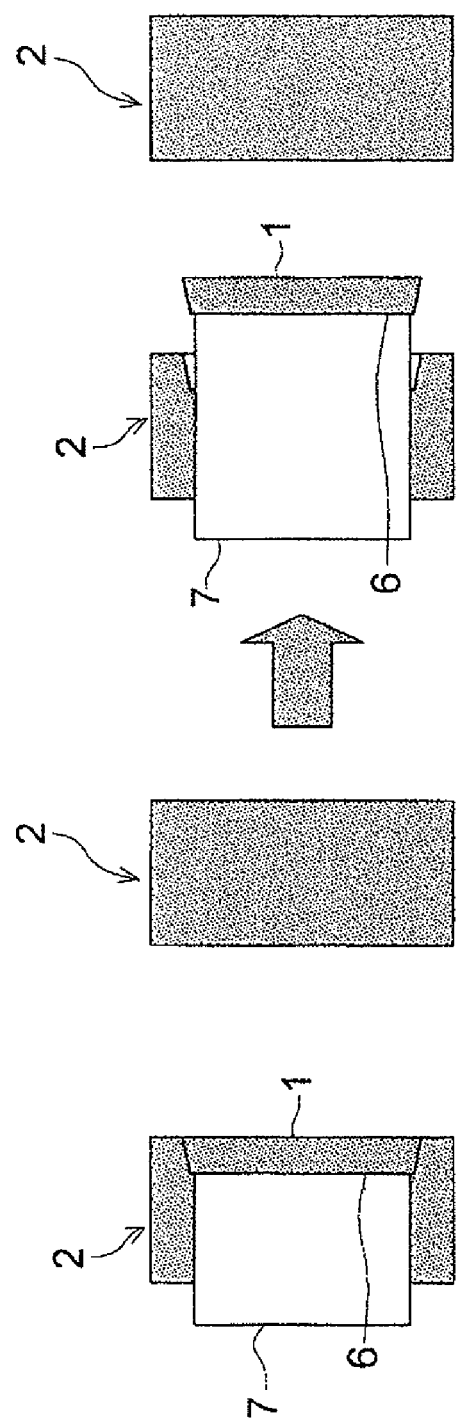
FIG. 11 shows sectional views of a conventional injection-molding die.

The precedent extraction process shown in FIG. 6a where the taper pin 23 has been retracted is carried out before the extrusion process and after the separation process shown in FIG. 6a. When the taper pin 23 is retracted in the opposite direction from the die 30 of the other side, since the circumferential edge of base hole 22 stops the entrance periphery 132 of the through-hole 13 of the cylindrical part 15, the cylindrical part 15 is not retracted together with the taper pin 23, and the inner wall 131 of the through-hole 13 is separated from the taper part 231. The mold release resistance of the through-hole 13 becomes extremely low.

(Extrusion Process)

Next, by making the taper pin 23 protrude toward the die 30 of the other side from the base hole 22 in the extrusion process, the inner wall 131 of the through-hole 13 is pushed out by the taper part 231 toward the die 30 of the other side. In the precedent extraction process, the mold release resistance of the through-hole 13 is made extremely low. Therefore, the mold can be taken out from the one die, without generating distortion or reduction of flatness of the surface 12 (a joint surface of the mold) of the other side of the substrate 10, near the through-hole 13 in the extrusion process.

In addition, in the injection molding concerning the 2nd embodiment, the precedent extraction process can be added. That is, the taper pin 23 may be constituted to be able to move in and out, and the taper pin 23 may be retracted before the extrusion process by using the sleeve 24. Thereby, distortion and reduction of flatness the surface 12 (a joint surface of the mold) of the other side of the substrate 10 can be further suppressed.

The 4th Embodiment

Next, the injection-molding die concerning the 4th embodiment will be described with reference to FIGS. 7a and 7b, which are sectional views of the injection-molding die concerning the 4th embodiment.

The feature of the injection-molding die concerning the 4th embodiment is that the sleeve 24 concerning the 2nd embodiment is eliminated. Moreover, the diameter of the base hole 22 concerning the 3rd embodiment is enlarged, and the feature is that the gap S1 is formed between the wall of the base hole 22 and the cylinder part 232 of the taper pin 23. In FIG. 7a, the state where the hole diameter of the base hole 22 has been enlarged and the gap S1 is formed is shown.

Also in the 4th embodiment, the through-hole 13 is provided in the center of the cylindrical part 15, and the mold release resistance of the through-hole 13 is large. However, air is allowed to blow off from the gap S1 between the wall of the base hole 22 and the cylinder part 232 of the taper pin 23 and the blown air is allowed to pass through a gap S1 between the wall of the taper channel 211 and the outer wall 151 of the cylindrical part 15. Moreover, the air is allowed to pass through a gap S1 between the taper part 231 and the inner wall 131 of the through-hole 13 (air blowing process shown in FIG. 7b). Thereby, it is possible to make the mold release resistance of the through-hole 13 extremely small.

In addition, the above-mentioned air blowing process can be combined with the injection-molding method concerning the 2nd embodiment or the 3rd embodiment. Moreover, the above-mentioned air blowing process may be combined with the method which has been created by combining the injection-molding methods concerning the 2nd embodiment and the 3rd embodiment with each other. When using the above-mentioned air blowing process combined with the injection-molding method concerning the 3rd embodiment, the above-mentioned air blowing process and the precedent extraction process concerning the 3rd embodiment can be performed simultaneously.

Further, the above-mentioned air blowing process can be used by combining the process with the injection-molding method concerning the 1st embodiment.

What is claimed is:

1. An injection molding method of a plate-shaped substrate made of resin to be joined to a covering material, the injection molding method comprising the steps of:
    coupling a die of one side, which forms one surface of the substrate with a die of another side, which forms another surface which is located on an opposite side of the substrate from the one surface and on which a fine flow path is provided and the covering material is to be joined so as to compose a cavity;
    first composing a part of the die of one side which forms a through-hole which is provided so that a size of the hole gradually becomes smaller in a direction from the one surface toward the another surface and which communicates with the fine flow path, by using a taper pin protruded from the die of one side toward the die of another side;
    filling the cavity with resin material so as to form the substrate;
    separating the substrate and the die of another side from each other by separating the die of one side and the die of another side from each other; and
    extruding the substrate to separate the substrate from the die of one side by further protruding the taper pin toward the die of another side to cause the taper pin to push an inner wall of the through-hole.

2. The injection molding method of claim 1,
    wherein, in the coupling step, the die of one side is moved closer to the die of another side, which is a die of a stationary side, and in the separating step, the die of one side is moved away from the die of another side.

3. The injection molding method of claim 1,
wherein, in the coupling step, a position where a tip of the taper pin comes in contact with the die of another side is a position which has been shifted from a part of the die of another side which forms the another surface, toward the die of one side by an amount substantially equivalent to a depth of the fine flow path.

4. The injection molding method of claim 1,
wherein, in the first composing step, a large diameter part which is integrally formed on the taper pin and which forms an entrance periphery of the through-hole composes a part of the die of one side, and in the extruding step, the entrance periphery of the through-hole is pushed by the large diameter part.

5. The injection molding method of claim 1, further comprising:
precedently extracting the taper pin so as to separate the wall of the through-hole and the taper pin from each other by retracting the taper pin in an opposite direction from the die of another side, before the extruding step.

6. An injection molding method of a plate-shaped substrate made of resin to be joined to a covering material, the injection molding method comprising the steps of:
coupling a die of one side, which forms one surface of the substrate on which a cylindrical part is provided to be protruded from the one surface toward an opposite side from another surface which is located on an opposite side of the substrate from the one surface with a die of another side, which forms the another surface one which a fine flow path is provided and the covering material is to be joined so as to compose a cavity;
first composing a part of the die of one side which forms a through-hole which is provided in a center of the cylindrical part so that a size of the hole gradually becomes smaller in a direction from the one surface toward the another surface and which communicates with the fine flow path, by using a taper pin protruded from the die of one side toward the die of another side;
second composing a part of the die of one side which forms an entrance periphery of the through-hole on the cylindrical part by using an end surface of a sleeve which has been moved into a base hole on the die of one side, the sleeve being fitted around the taper pin and capable of being moved into and moved out of the base hole;
filling the cavity with resin material so as to form the substrate;
separating the substrate and the die of anther side from each other by separating the die of one side and the die of another side from each other; and
extruding the substrate to separate the substrate from the die of one side by protruding the sleeve from the base hole to make the end surface of the sleeve push the entrance periphery of the through-hole on the cylindrical part.

7. The injection molding method of claim 6,
wherein, in the second composing step, the outer wall formation part which forms an outer wall of the cylindrical part, whose diameter gradually becomes larger in a direction from a tip side of the cylindrical part toward the one surface which is a base end side composes a part of the die of one side, the outer wall formation part being integrally formed on the end surface of the sleeve, and further in the extruding step, the outer wall of the cylindrical part is pushed by the outer wall formation part.

8. The injection molding method of claim 6,
wherein, in the coupling step, the die of one side is moved closer to the die of another side, which is a die of a stationary side, and in the separating step, the die of one side is moved away from the die of another side.

9. The injection molding method of claim 6,
wherein, in the coupling step, a position where a tip of the taper pin comes in contact with the die of another side is a position which has been shifted from a part of the die of another side which forms the another surface, toward the die of one side by an amount substantially equivalent to a depth of the fine flow path.

10. The injection molding method of claim 6, further comprising:
precedently extracting the taper pin so as to separate the wall of the through-hole and the taper pin from each other by retracting the taper pin in an opposite direction from the die of another side, before the extruding step.

11. An injection molding die for a plate-shaped substrate made of resin to be joined to a covering material, the injection molding die comprising:
a die of one side, which forms one surface of the substrate on which a cylindrical part is provided to be protruded from the one surface toward an opposite side from another surface which is located on an opposite side of the substrate from the one surface;
a die of another side, which forms the another surface on which a fine flow path is provided and the covering material is to be joined and from which the substrate is separated by separating the die of another side from the die of one side relatively, after coupling the die of another side with the die of one side to compose a cavity and filling the cavity with resin material to form the substrate;
a taper pin which composes a part of the die of one side which forms a through-hole which is provided in a center of the cylindrical part so that a size of the hole gradually becomes smaller in a direction from the one surface toward the another surface and which communicates with the fine flow path, by protruding from the die of one side toward the die of another side; and
a sleeve which is fitted around the taper pin and capable of being moved into and moved out of a base hole on the die of one side, whose end surface composes a part of the die of one side, which forms an entrance periphery of the through-hole on the cylindrical part by having been moved into the base hole and which separates the substrate from the die of one side by protruding from the base hole to make the end surface of the sleeve push the entrance periphery of the through-hole on the cylindrical part.

12. An injection molding method of a plate-shaped substrate made of resin to be joined to a covering material, the injection molding method comprising the steps of:
coupling a first die which forms a first surface of the substrate with a second die which forms a second surface of the substrate so as to compose a cavity between said first and second dies, wherein said second surface is located on an opposite side of the substrate relative to the first surface;
the second die contacting with a taper pin which is protruded from the first die toward the second die and is movable relative to the first die;
filling the cavity with resin material, after the contacting step, so as to form the substrate having a through-hole provided between the first and second surfaces thereof, wherein said through-hole has a hole size gradually becoming smaller in a direction from the first surface toward the second surface and connects with a fine flow path provided on the second surface of the substrate;

separating the substrate from the second die by decoupling the first die from the second die; and separating the substrate from the first die by moving the taper pin so that the taper pin pushes an inner wall of the through-hole of the substrate.

13. The injection molding method of claim 12, wherein the first die is a movable die, and the second die is a stationary die.

14. An injection molding method of a plate-shaped substrate made of resin to be joined to a covering material, the injection molding method comprising the steps of:

coupling a first die which forms a first surface of the substrate with a second die which forms a second surface of the substrate so as to compose a cavity between said first and second dies, said second surface being located on an opposite side of the substrate relative to the first surface, wherein said first die has a hole connecting the cavity and a rear surface of the first die;

the second die contacting with a taper pin protruded from the first die through the hole of the first die;

setting a sleeve inserted into the hole of the first die so that an end surface of the sleeve is positioned between the cavity and the rear surface of the first die and fits an outside of the taper pin;

filling the cavity and a part of the hole of the first die, which does not face the sleeve, with resin material, after the contacting step and the setting step, so as to form the substrate having a cylindrical part provided on the first surface thereof, said cylindrical part having a through-hole provided in a center thereof, said through-hole having a hole size gradually becoming smaller in a direction from a tip of the cylindrical part to the second surface of the substrate;

separating the substrate from the second die by decoupling the first die from the second die; and separating the substrate from the first die by moving the sleeve relative to the first die and the taper pin so that the end surface of the sleeve pushes an entrance periphery of the through-hole on the cylindrical part.

15. The injection molding method of claim 14, wherein the hole of the first die comprises a tapered part which connects to the cavity and has a hole size that gradually becomes smaller in a direction from the cavity to the rear surface of the first die.

16. The injection molding method of claim 14, wherein the first die is a moveable die, and the second die is a stationary die.

* * * * *